Nov. 12, 1968 — C. R. BROWNLEY — 3,409,920
SECTIONALIZED SURFBOARD
Filed Oct. 25, 1966 — 2 Sheets-Sheet 1
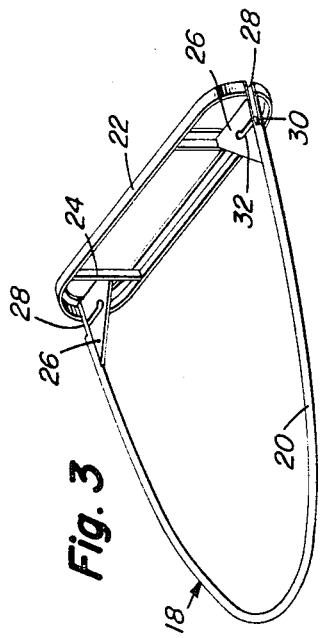
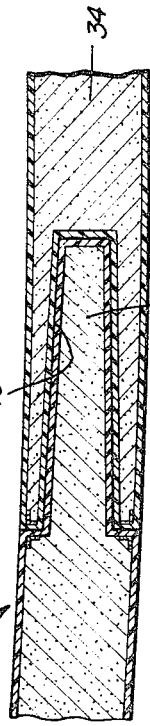
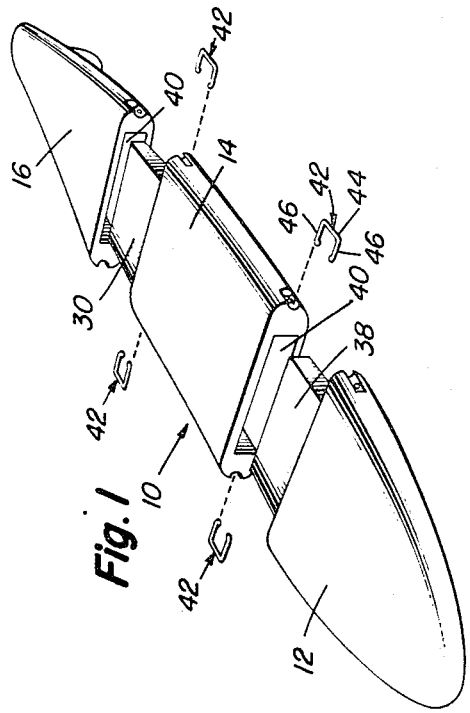
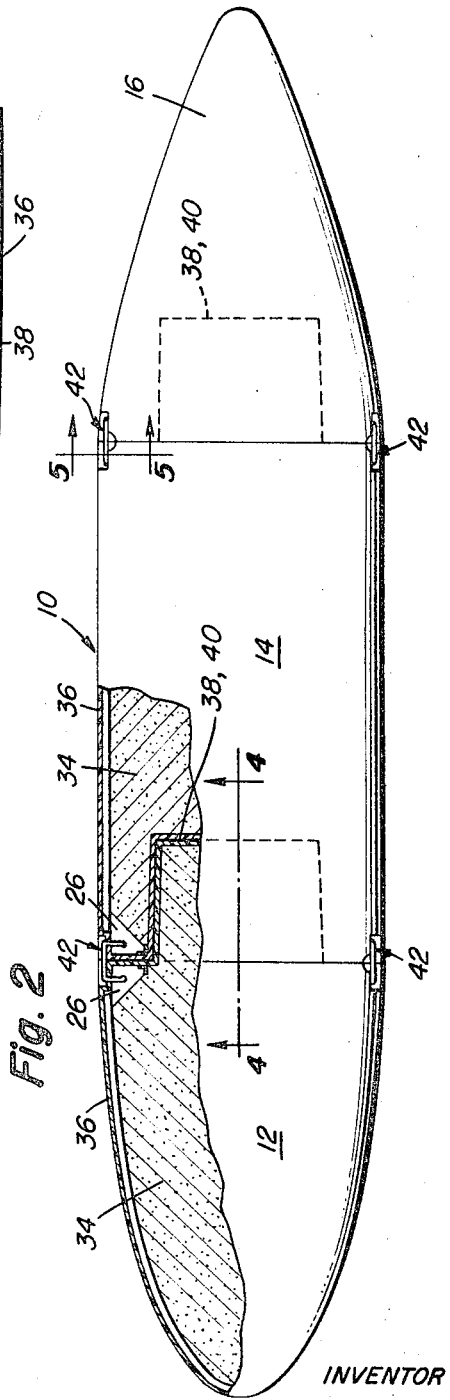
INVENTOR
Charles R. Brownley
BY Walter G. Finch
ATTORNEY Nov. 12, 1968
C. R. BROWNLEY
3,409,920
SECTIONALIZED SURFBOARD
Filed Oct. 25, 1966
2 Sheets-Sheet 2
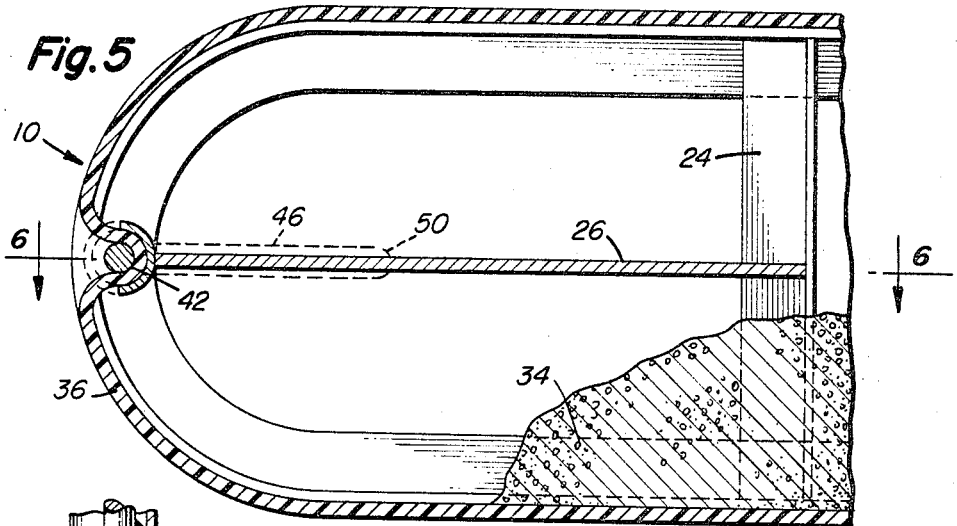
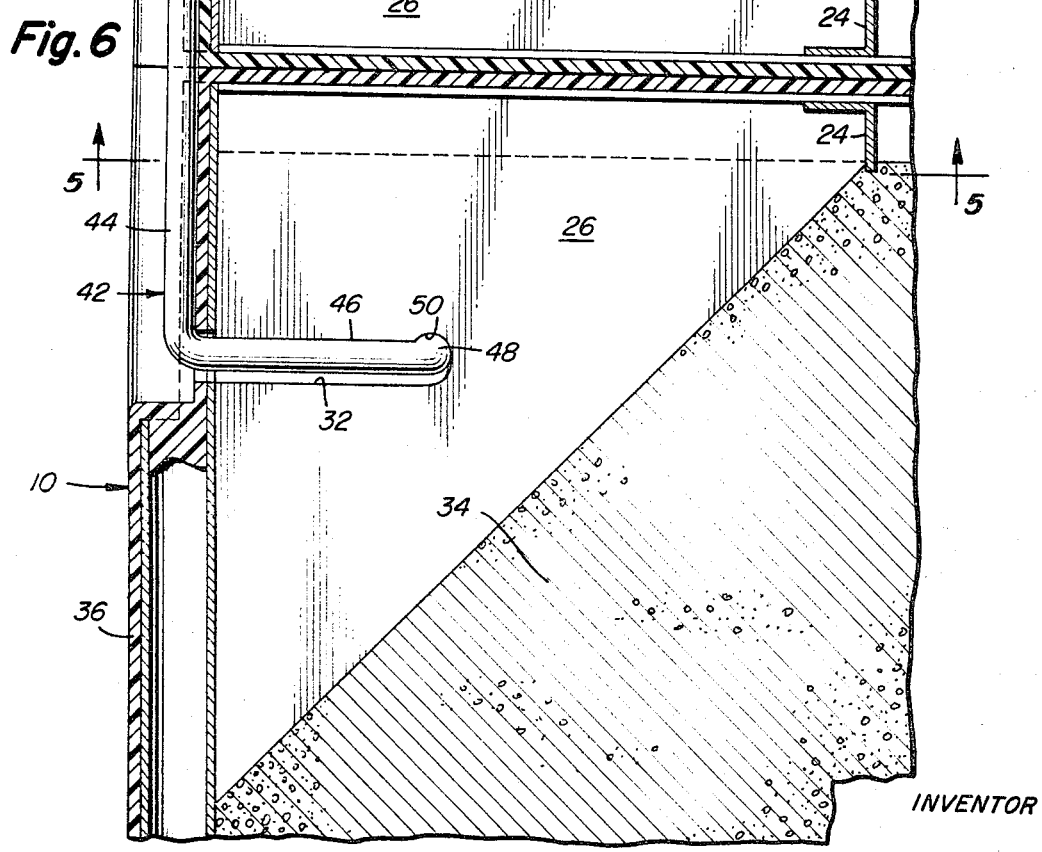
INVENTOR
Charles R. Brownley
BY Walter G. Finch
ATTORNEY

United States Patent Office 3,409,920
Patented Nov. 12, 1968

3,409,920
SECTIONALIZED SURFBOARD
Charles R. Brownley, Box 102A,
Forest Hill, Md. 21050
Filed Oct. 25, 1966, Ser. No. 589,251
7 Claims. (Cl. 9—310)

ABSTRACT OF THE DISCLOSURE

This disclosure portrays a framed plastic foam surfboard which is sectionalized and mortised for ready disassembly. The framing is essentially profile conforming and includes transverse trusses and gusset elements at the section joints. Fasteners in the form of U-clips bridge from one section to the next and nest in cutaways which are coextensive with the edging frame. The ends of these fasteners are ball shaped and snap detent-wise into keyhole shaped apertures in the gussets. In this manner the frame is made effectively continuous about the assembled sections.

---

This invention relates generally to aquatic devices, and more particularly it pertains to a collapsible sectionalized surfboard.

The concept of sectionalized surfboards is not new. For example, see U.S. Letters Patent 3,137,873. However, the sectionalizing and joining of the sections of foam plastic types as opposed to solid wood types has not heretofore been attempted.

It will be appreciated that great stress is encountered in use and the severe pounding and twisting forces require novel techniques in order that the new light-weight surfboards be successfully sectionalized.

Accordingly, it is an object of this invention to provide a light-weight surfboard construction which is especially designed for longitudinal strength and superior edge protection and which provides for variable length by simple replacement of a center section.

Another object of this invention is to provide a surfboard which can be disassembled to sections for portability and storage without the use of tools.

Still another object of this invention is to provide a tapered mortise-and-tenon socket and clip arrangement for joining the sections of a thin elongated float without danger of buckling at the joint.

Other objects and attendant advantages of this invention will become more readily apparent and understood from the following detailed specification and accompanying drawings in which:

FIG. 1 is an exploded perspective view of a sectionalized surfboard incorporating features of this invention;

FIG. 2 is a plan view, partly broken away, of the surfboard of FIG. 1;

FIG. 3 is a perspective view of a typical framework for a section of the surfboard;

FIG. 4 is a section taken on line 4—4 of FIG. 2 depicted to somewhat larger scale;

FIG. 5 is a section taken on line 5—5 of FIG. 2 shown approximately full scale, and FIG. 6 is a section 6—6 of FIG. 5.

Referring now to the details of the drawings, reference numeral 10 indicates generally a surfboard incorporating novel features of this invention. This surfboard 10 is made in three sections; a nose section 12, a center section 14 and a tail section 16 so fashioned as to allow ready assembly one to the other.

Each section 12, 14 and 16 has an integral frame 18 of light metal, a typical frame (for the nose section 12) being shown in FIG. 3 before the casting of the plastic filler and cover is done.

The frame 18 consists of a tubular edging 20 which conforms to the outer edges of the respective section 12, 14, or 16. This edging 20 is welded at its ends to a transverse truss 22 of L-structure bent to conform to the cross perimeter of the surfboard 10 at a junction point of sections.

A pair of spaced vertical cross pieces 24 are attached to the truss 22 and each support one point of a gusset 26. The opposite edge of the gusset 26 is welded to the inner side of edging 20. The outer side of edging 20 at this point is machined to form a cutaway 28 which extends a distance of about one-half the width of the gusset 26 and through the end of the transverse truss 22.

A pin hole 30 is bored through this cutaway 28 and registers with a keyhole slot 32 punched in the gusset 26.

The frames 18 are placed in a mold which is filled with buoyant plastic foam filler 34. A plastic cover 36 is next applied overall, care being taken to keep the cutaway 28, pin hole 30, and slot 32, clear of material by suitable temporary fixtures. The mold for this casting operation incorporates a pattern piece whereby either a tapered tenon 38 or a tapered mortise 40 may be formed at the junction end (or ends) of the section as shown best in FIG. 4.

When the sections 12, 14, and 16 are assembled tenon-to-mortise 38, 40 in tapered fit as shown in FIG. 2, a U-shaped removable clip 42 of resilient round metal rod is employed to hold them together and to cross-reinforce the junction. This clip 42 comprises a straight stiff bridge 44 which joins two opposite parallel pin ends 46 extending at right angles thereto. A ball 48 is formed at the end of each pin of a diameter approximating the width of the keyhole slot 26 and adapted to snap detent-wise into the enlarged end 50 of it.

It will be noted, thus installed, the bridge 40 of the clip 42 extends within the cutaway 28 of one section and over the junction into the cutaway 28 of the next section being snugly retained and supported over its entire length as a strengthening continuation of the frames 18 as best shown in FIGS. 5 and 6.

Each pin end 46 is detented in place to hold the clip 42 securely in place. To remove the clips 42 it is only necessary to pluck them out with the fingers whereupon the mortised sections 12, 14, 16 may be disassembled one from the other for portability and compact storage of the surfboard 10.

What is claimed is:

1. In a collapsible surfboard composed of a plurality of sections in faired longitudinal series said sections being mortised one to another and having removable clip means for holding the sections together, the improvement comprising: the said mortised connection including a tapered tenon on a section, adapted to engage an abutting section having a tapered mortise socket; the said tenon and socket being in breadth and in length a substantial portion of the width of the surfboard; each said sections having an aperture median the thickness thereof and extending thereinto adjacent the junction between said sections, each said aperture terminating in an enlarged end within its respective section, said clip means including a member bridging the junction between adjacent said sections and pins extending from each end of said member and into said aperture in each said adjacent sections, said pins terminating in enlarged elements for snapping into said enlarged end of its respective aperture.

2. The structure of claim 1 wherein each of the surfboard sections consists of a foamed plastic core and a solid plastic coating over said core, welded metal frame means positioned within each said surfboard sections, said frame means defining said aperture and enlarged end thereof in each said surfboard sections.

3. The structure of claim 2 wherein said surfboard sections consist of a nose section, a center section, and a tail section, the said center section having substantially parallel sides in plan view, whereby the said collapsible surfboard may be elongated or shortened by substitution of a longer or shorter said center section.

4. The structure of claim 2 wherein each said frame means has a tubular metal edging conforming to the outer edge of its respective section; a transverse truss conforming to the cross perimeter of its respective section adjacent the junction thereof with another of said sections; a pair of laterally spaced cross-pieces vertically secured to said truss; and a respective gusset, having therein a said enlarged end aperture, and extending outward from each said cross-piece to the said edging.

5. The structure of claim 4 wherein the portion of said edging which is adjacent said junction is cut away, with said bridging member fitting into said cutaway.

6. In a sectional surfboard comprising a plurality of longitudinal sections mortised together, the improvement comprising: each said section including a plastic body moulded over a welded metal frame assembly; the frame assembly including a tubular metal edging, a curved metal truss conforming to the cross-perimeter adjacent the junction of the said section with another said section, a gusset member extending outwardly from each said crosspiece to said tubular metal edging the said tubular metal edging having a recess and an opening therein and the said gusset member having a keyhole slot in register with the said opening; whereby the said edging and gusset are adapted for receiving substantially U-shaped clip means for longitudinally securing the said sections together.

7. In a device as recited in claim 6, a detachable substantially U-shaped clip means having substantially upset ends adapted to engage a pair of said keyhole slots adjacent the junction of two said sections, thereby longitudinally securing the said sections together.

References Cited

UNITED STATES PATENTS

| | | | |
|---|---|---|---|
| 909,080 | 1/1909 | Goodrow | 287—92.5 |
| 1,853,159 | 4/1932 | Welsh | 9—310 |
| 3,137,873 | 6/1964 | Garrolini | 9—310 |
| 3,287,754 | 11/1966 | Price et al. | 9—310 |

MILTON BUCHLER, *Primary Examiner.*

FERGUS S. MIDDLETON, *Examiner.*

P. E. SAUBERER, *Assistant Examiner.*